United States Patent Office 3,336,261
Patented Aug. 15, 1967

3,336,261
POLYCYANOTEREPHTHALYLIDENE POLYMERS
AND METHOD OF PREPARATION
Harry A. Smith and William K. Carrington, Midland,
Mich., assignors to The Dow Chemical Company, Midland, Mich., a corporation of Delaware
No Drawing. Filed Dec. 2, 1963, Ser. No. 327,486
2 Claims. (Cl. 260—52)

This invention concerns resinous polycyanoterephthalylidene polymers and their method of preparation.

In attempting to prepare thermally stable polyterephthalylidenes and polycyanoterephthalylidenes, the latter by condensing terephthalaldehyde with 1,4-benzenediacetonitrile, previous workers obtained infusible insoluble products which were not usable; Lenz et al., J. Org. Chem., 25: 813 (1960).

It has now been discovered that aryl dialdehydes, prototype terephthalaldehyde, can be condensed with dicyanomethyl diaryl compounds, prototype 4,4'-dicyanomethyl diphenyl ether, to give prototype polycyanoterephthalylidene polymers which are fusible and moldable into transparent films and make good metal adhesives.

In the practice of this invention, an aryl dialdehyde, e.g., terephthalaldehyde, and nuclearly substituted lower alkyl and halo homologs and analogs thereof, is condensed with a dicyanomethyl diaryl compound, e.g., 4,4'-dicyanomethyl diphenyl ether, and nuclearly substituted lower alkyl and halo homologs and analogs thereof, in solution in a lower alkanol reaction medium under non-oxidizing or inert conditions, i.e., under an inert gas such as nitrogen, in the presence of an alkali metal, an alkali metal alkoxide, pyridine or piperidine catalyst at a reaction temperature between −80 and 80° C. for a time sufficient for a Knoevenagel-type condensation to take place, generally 10 hours or more up to 48 hours. Equimolar proportions of reactants are used when it is desired to get as high a molecular weight as possible. For lower molecular weight products a molecular excess of either reactant, advantageously a molecular excess of 20 percent of the dialdehyde or a reaction time or temperature within the lower range of the limits given above is used. A simple series of tests suffices to give the process parameters for a desired molecular weight product. While any amount of catalyst is operable commensurate with the reaction rate desired, one-tenth the equivalent amount or more of the dicyanomethyl compound, i.e., at least two-tenth molar proportion of catalyst per mole dicyanomethyl compound, is most generally advantageous.

The dicyanomethyl diaryl compounds useful in the practice of this invention are the isomeric 4,4'-, 3,3'-, 3,4'- and 4,3'-dicyanomethyl diphenyl ether, the analogous dicyanomethyl diphenyl sulfides and nuclearly substituted lower alkyl and halo homologs and analogs of the foregoing.

The aryl dialdehydes useful in the practice of this invention are terephthalaldehyde, 1,4- and 1,5-naphthalene dialdehyde, 1,4-, 1,5-, 1,10- and 9,10-anthracene dialdehyde and nuclearly substituted lower alkyl and halo homologs and analogs of the foregoing. By lower alkyl in each of the foregoing paragraphs is meant a 1 to 4 carbon alkyl group. By halo is meant chloro and bromo.

The following example describes completely representative specific embodiments and the best mode contemplated by the inventors of carrying out their inventive process. It is not to be taken as limiting the invention other than as defined in the claims.

*Example.—Polymer preparation*

To 59 ml. of absolute ethanol is added 0.2 g. of sodium. The solution is stirred until the sodium has all reacted. The resulting solution is then added slowly, dropwise, to a stirred mixture of 3.7 g. (0.0149 mole) of 4,4'-dicyanomethyl diphenyl ether, 2.0 g. (0.0149 mole) of terephthalaldehyde, and 250 ml. of absolute ethanol cooled to 0–5° C. under a nitrogen atmosphere. After all the sodium-ethanol solution is added, the reaction is run an additional 20 hours at 0–5° C. and then filtered. Yield of bright yellow polymer is 4.2 g. or 71.3 percent, M.R. 285–305° C. Infrared spectroscopy indicates the structure:

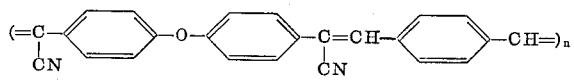

A molecular weight of 7,000 is indicated from elemental analysis.

The thermoplastic product so obtained is moldable by compression molding at 350° C. and 2,000 lb./sq. in. pressure for ca. 30 minutes. The molten resin is an excellent adhesive for laminating aluminum foil and sheets of glass.

The procedure of the preceding example when repeated with substitution of an equimolar proportion of any of the other foregoing dicyanomethyl diphenyl ethers or dicyanomethyl diphenyl sulfides or nuclearly substituted lower alkyl or halo homologs or analogs of the foregoing or when repeated with substitution of an equimolar proportion of any of the other previously described aryl dialdehydes or by substitution of any of the other previously described catalysts in the presence of any other lower alkanol reaction medium having up to 4 carbon atoms in amount sufficient to dissolve the reactants also gives polycyanoterephthalylidene polymers.

What is claimed is:

1. A thermoplastic resinous polymer consisting essentially of the following units in polymeric form:

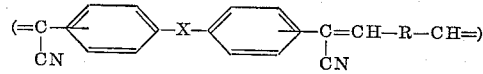

wherein X is O or S; =CH—R—CH= is a residue of an aldehyde of the group consisting of terephthalaldehyde, 1,4- or 1,5-naphthalene dialdehyde, 1,4-, 1,5-, 1,10- or 9,10-anthracene dialdehyde, or nuclearly-substituted lower alkyl homologs thereof or chloro- or bromo-substituted analogs of one of the foregoing dialdehydes; and wherein the phenylene residues may have lower alkyl and/or chloro- or bromo-nuclear substituents thereupon.

2. A thermoplastic resinous polymer consisting essentially of the following units in polymeric form:

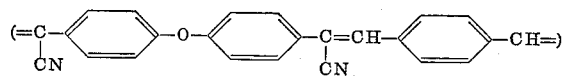

and having a molecular weight of 7,000.

References Cited

FOREIGN PATENTS

| 985,765 | 7/1951 | France. |
| 1,088,637 | 9/1960 | Germany. |

OTHER REFERENCES

Saxe et al.: Jour. of Patent Office Soc., vol. XLII, No. 8, August 1960, pp. 528–561.

Kunststoffe: vol. 53, No. 7, July 1963 (English translation) pp. 11–21.

WILLIAM H. SHORT, *Primary Examiner*.

L. MILLER, *Assistant Examiner*.